March 29, 1927.
W. P. WIEMANN
DIRECTION INDICATOR
Filed May 19, 1926

1,622,895

INVENTOR.
W. P. Wiemann,
BY
Geo. F. Kimmel
ATTORNEY.

Patented Mar. 29, 1927.  1,622,895

UNITED STATES PATENT OFFICE.

WILLIAM P. WIEMANN, OF PITTSBURGH, PENNSYLVANIA, ASSIGNOR TO THE WIEMANN CO., OF PITTSBURGH, PENNSYLVANIA.

DIRECTION INDICATOR.

Application filed May 19, 1926. Serial No. 110,213.

This invention relates to a direction indicator for motor vehicles and has for its object to provide, in a manner as hereinafter set forth, an indicator of such class providing a thoroughly efficient and understandable means of signalling the intended movement of the motor vehicle before the execution of such movement, in order to safeguard life and property, and further to provide an indicator code of such simplicity that it will be readily understood by automobile or motor vehicle operators and pedestrians alike, in order to secure and provide sufficient time for safety before the execution of the movement, and further to secure and provide a visible means of indication that may be seen and understood during the day or night.

Further objects of the invention are to provide, in a manner as hereinafter set forth, a direction indicator, which is simple in its construction and arrangement, strong, durable, compact, conveniently operated, readily installed with respect to the motor vehicle, visible in day and at night, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
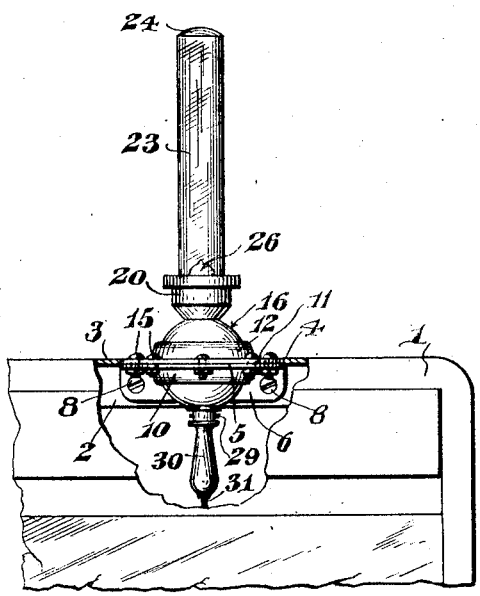
Figure 1 is an elevation of a direction indicator, in accordance with this invention, showing the adaptation thereof with respect to the top of a motor vehicle.

The invention consists of a visible indicator column, to be located at a position on top, or at a point at the front left corner of the automobile or motor vehicle or operator's cage, and provided with an operating handle within easy reach of the operator and with the indicator so positioned that it may be seen from any angle except from a position at the rear right of the car or vehicle or in other words viewable from all points within view of the operator of the indicator.

The indicator column is arranged to operate with a ball and socket joint or the equivalent thereof and with the visible column projecting above the roof of the vehicle, and with the operating handle within easy reach of the operator. The column being adaptable to an angle forty-five degrees, from the vertical or horizontal, by which forward or backward movement, right or left turn may be indicated by the angular directional position of the visible column.

The visible indicator column which normally is disposed in a vertical position and projects above the body of the car, is so set up that it can be shifted forwardly, rearwardly, to the left or to the right, with respect to the longitudinal axis or length of the car for direction indicating purposes. When extending in a vertical position it indicates stop or caution, when positioned forwardly it indicates a forward movement, when shifted rearwardly it indicates a backward movement, when shifted to the right a right turn and when shifted to the left a left turn.

Referring to the drawings in detail 1 denotes the top of a motor vehicle body and which indicates a series of supports and one of which is indicated at 2. The cover which forms an element of the top 1 is indicated at 3 and is provided with an opening 4 which may be arranged rearwardly or forwardly with respect to the support 2, but preferably forwardly of the support 2.

Secured to one side of the support 2 is a bracket element consisting of a plate 5 which is disposed at right angles with respect to the support 2 and as shown projects forwardly from the latter. The rear end of the plate 5 is formed with a vertically disposed depending flange 6, provided with openings 7 for the passage of hold fast devices 8 to fixedly secure the bracket to the support 2. The plate 5 is formed with a centrally disposed circular opening 9 and with a depending vertically disposed annular flange 10, which in vertical section, is of arcuate form. The wall of the opening 9 forms a continuation of the arc of the inner face of the flange 10. The plate 5 is flush with the top edge of the support 2.

Mounted upon the plate 5 is a flat annulus 11 having its inner edge flush with the wall of the opening 9 and formed to provide a continuation of the arc of the wall of the latter. The annulus 11 is provided with an integral upstanding annular flange 12, which in vertical section, is of arcuate contour and the inner face of the flange 12 forms a continuation of the arc of the inner edge of the annulus 11. The annulus 11 is formed with openings 13 which register with openings 14 formed in the plate 5 and extending through said registering openings are hold fast devices 15 for fixedly securing the annulus 11 to the plate 5. The annulus 11 has its upper face flush with the outer face of the cover 3. The plate 5 in connection with the wall of its opening 9, as well as its flange 10, the annulus 11 and the flange 12 provide the fixed outer section of a universal or a ball and socket joint.

The shiftable or inner section of the universal joint is indicated at 16, and it consists of a hollow spherical member 17, which extends above the flange 12 and below the flange 10 and further frictionally engages with said flanges, but the engagement is such as to permit of the shifting of the member 17 when desired. The frictional engagement between the member 17 and the flanges 10 and 12 will provide for the holding of the member 17 in its shifted position.

Figure 2:
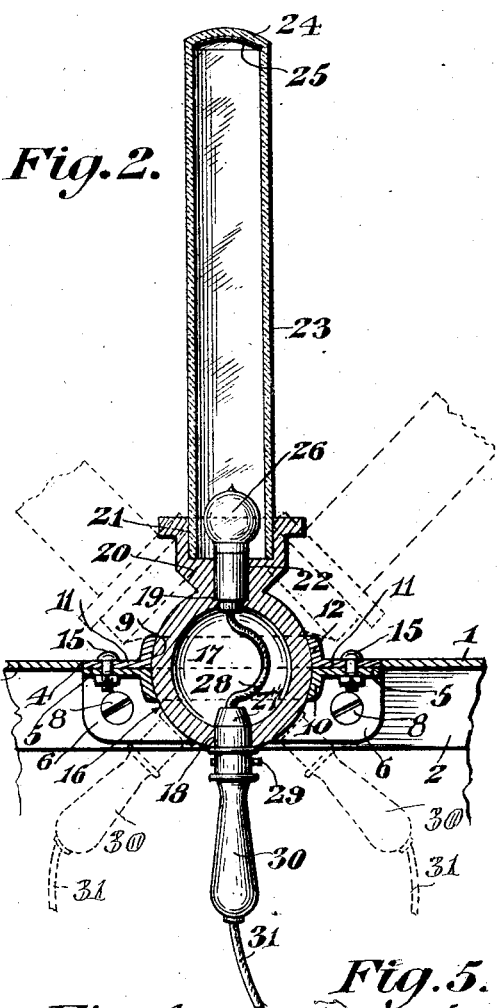
Figure 2 is a vertical sectional view of the direction indicator in accordance with this invention and further illustrating in dotted lines certain of the positions of the indicator.

The member 17 is formed with a pair of openings 18, 19 which are diametrically opposed and said member 17 is furthermore provided with an integral flanged extension 20 provided with a socket 21 and also with a socket 22. The socket 21 is of greater diameter than the socket 22 and the latter is arranged axially of the extension 20 and opens into the socket 21. The opening 19 in the member 17 communicates with the socket 22. Secured in the socket 21, as well as projecting a substantial distance from the extension 20 is a visible indicator column or signal arm 23 of tubular form. The outer end of the column 23 is closed as at 24 and the inner end thereof open. Secured against the inner face of the closed outer end 24 of the column 23 is a reflector 25. An illuminating element, for the column 23, is mounted in the opening 19, socket 20 and extends into the inner portion of the column 23. The illuminating element is indicated at 26. Secured in the opening 18 is a circuit opening and closing element 27 and leading therefrom to the illuminating element 26 are circuit connections 28. The circuit opening and closing element 27 is formed with a manually shiftable switch 29 and extending from said element 27 is a handle member 30. Circuit connections 31 lead from the source of electrical energy and extend through the handle member 30 and are connected to the element 27. The handle member 30 is rigidly secured to the element 27 and the latter is rigidly secured to the member 17 and the member 30 is employed for shifting the member 17 for the purpose of positioning the indicator column 23 at different angular positions and from the angular positions to a vertical position, see Figure 2. The column 23 is of such diameter and length that will render it visible and readable at least a hundred and fifty feet or more from the vehicle. When the member 17 is shifted to position the tube 23 at any desirable indicating position the frictional engagement between the sections of the universal joint will maintain the column in the position to which it has been adjusted.

Figure 3:
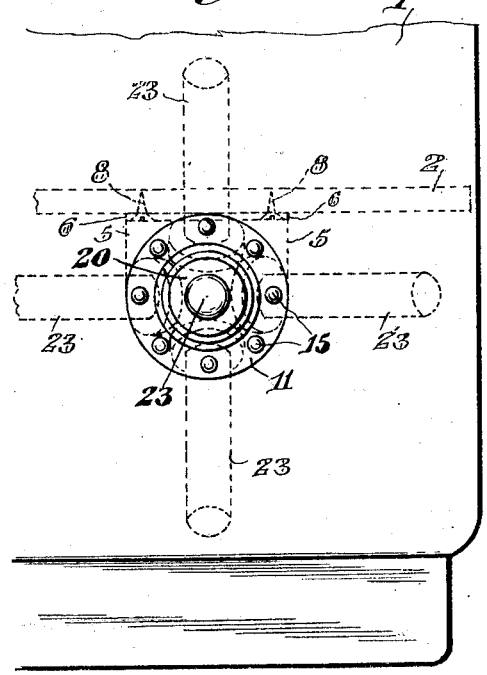
Figure 3 is a fragmentary view, in top plan, of the top of a motor vehicle, showing the adaptation therewith of a direction indicator in accordance with this invention and further illustrating in dotted line the several indicating positions of the indicator.
Figures 4, 5:
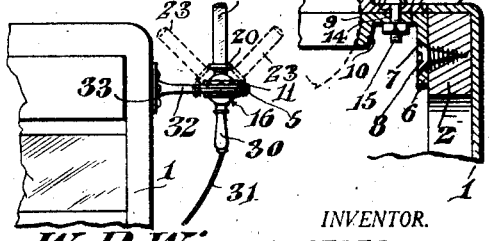
Figure 4 is an elevation of a direction indicator in accordance with this invention showing the adaptation thereof with respect to the side of a motor vehicle.
Figure 5 is a fragmentary view, in vertical section, of the indicator and further showing the indicator secured to one of the braces or supports of the top of the vehicle.

Referring to Figure 4 of the drawings the bracket element, referred to generally by the reference character 32 is fixedly secured to the side of the vehicle, as indicated at 33, whereby the bracket element will project laterally from the vehicle and support the column 23. The outer portion of the bracket element 32 is constructed to provide the outer section of a universal joint in the same manner as that referred to in connection with Figures 1, 2 and 3. The inner section of the universal joint connection in the form used in Figure 4 is the same as that referred to in connection with Figure 2.

It is thought the many advantages of a direction indicator for motor vehicles in accordance with this invention can be readily understood, and although the preferred embodiment of the invention is as illustrated and described, yet it is to be understood that changes in the details of construction can be had which fall within the scope of the invention as claimed.

What I claim is:

1. An automobile directional indicator comprising a vertically disposed universal bearing joint adapted to be secured to and extend above the top of the body of the automobile and including a movable section extending above and depending below such top, a visible column arranged above such top and secured to the movable section and shiftable to angular positions with respect to the longitudinal axis of the automobile, and an operating handle carried by said section and depending below such top.

2. An automobile directional indicator comprising a bearing adapted to be secured to and extend above the top of an automobile body, an operating member carried by said bearing, extended above such top and provided with a tube and a lamp socket, said tube arranged above such top, said operating member providing means for shifting said tube to angular positions with respect to the upper face of such top, and a handle carried by said member and depending below such top.

3. An automobile directional indicator comprising a bearing adapted to be secured to and project above the automobile top, an angularly adjustable indicator column arranged above such top, a movable member operating within said bearing, carrying said column and providing means for shifting the same to various angular positions, a handle carried by said member and depending below said top, and means for illuminating said column.

4. An automobile directional indicator, comprising a movable member operating in a bearing adapted to be secured in the automobile top, said member extended above such top, a visible indicator column carried by said member and capable of being shifted by the latter over said top to angular positions at forty-five degrees with respect to a horizontal plane, and a handle carried by the movable section and depending below the top.

5. An automobile directional indicator, comprising a movable member operating in a bearing adapted to be secured in the automobile top, said member extended above such top, a visible indicator column carried by said member and capable of being shifted by the latter over said top to angular positions at forty-five degrees with respect to a horizontal plane, a handle carried by the movable section and depending below the top, and said bearing and movable member co-acting for maintaining said column in set position.

6. An automobile directional indicator comprising a bearing adapted to be secured in the automobile top and project thereabove, an indicator column permanently arranged above such top, an adjustable member mounted in said bearing, projecting above and below such top and having said column connected to the upper portion thereof and providing means for adjusting said column with respect to the longitudinal axis of the automobile in the direction of proposed movement, forward, backward, right or left turn, and a handle connected with the lower portion of said member and depending below said top.

7. An automobile directional indicator comprising a stationary bearing adapted to be secured to the top of the automobile and extend thereabove, a directional indicator column permanently positioned above such top, a movable member carried by said bearing and having its upper portion connected with the inner end of said column, and means arranged below the top of the automobile and connected to said member to provide for the shifting of the latter to adjust said column to varying angular positions above such top with relation to the longitudinal axis of the automobile.

In testimony whereof, I affix my signature.

WILLIAM P. WIEMANN.